United States Patent Office 3,164,922
Patented Jan. 12, 1965

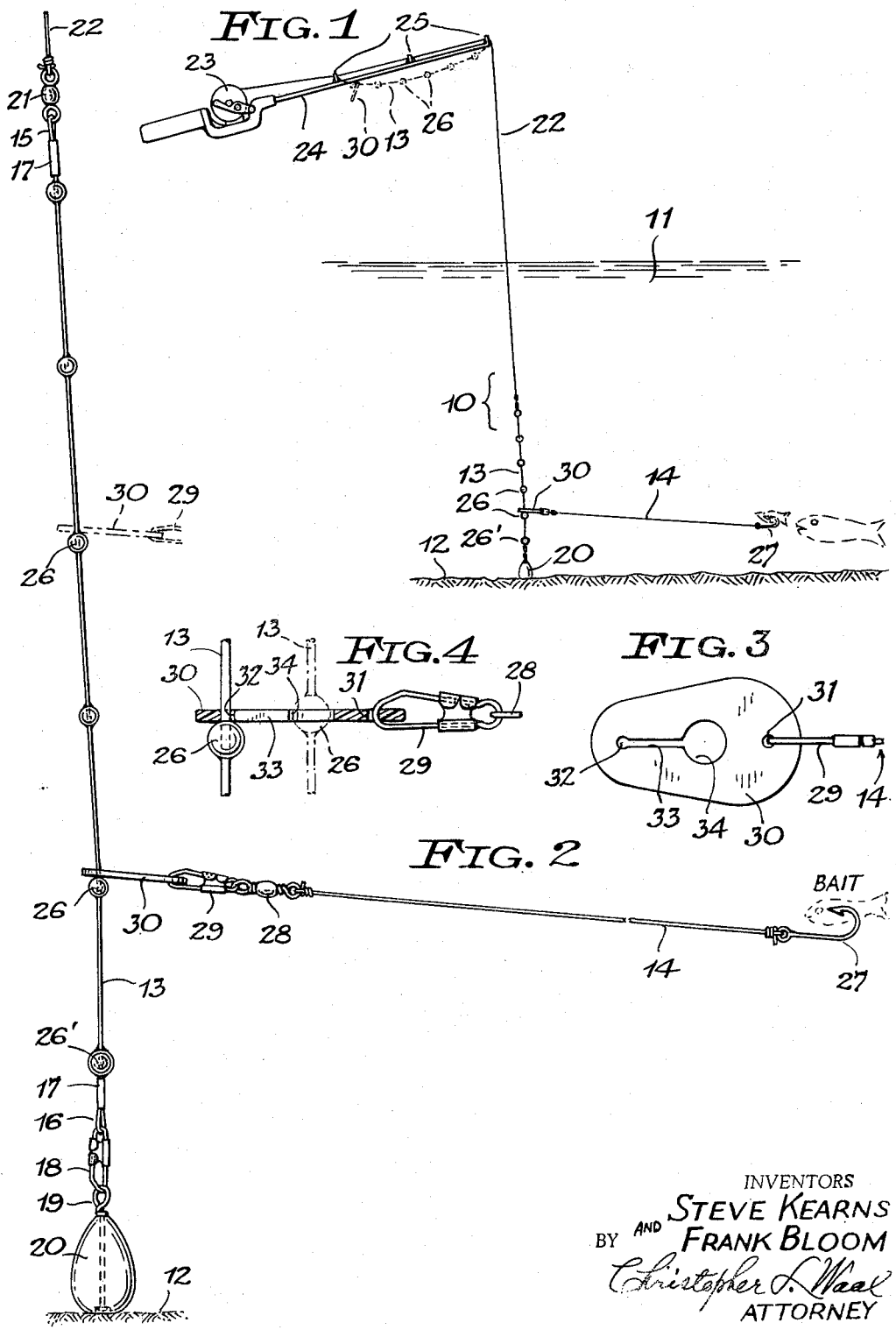

3,164,922
FISHING TACKLE
Steve Kearns, 1026A S. 11th St., and Frank Bloom, 4251 S. 10th St., both of Milwaukee, Wis.
Filed Mar. 18, 1963, Ser. No. 265,887
6 Claims. (Cl. 43—43.15)

This invention relates to fishing tackle for use in river fishing and also for trolling.

A type of fishing tackle for river fishing has heretofore been devised including a sinker leader and a fishhook leader both attached to a fishing line. Upon making a cast, the sinker descends to the river bed and the river current carries the fishhook leader downstream at a distance above the river bed.

An object of the invention is to provide improved fishing tackle of this general type including easily and quickly adjustable means of simple and inexpensive construction for changing the fishhook level above the river bed to suit fishing conditions.

Another object is to provide fishing tackle of this character which is convenient to handle and not likely to become snarled, which can easily and quickly be dismantled, and which includes components adapted to be readily stored in a tackle box.

A further object is to provide fishing tackle including improved connector means for coupling the fishhook leader to the sinker leader at selected positions along the sinker leader.

The invention further consists in the several features hereinafter described and claimed.

In the accompanying drawing,

FIG. 1 is a schematic elevational view of fishing tackle arranged in accordance with the invention;

FIG. 2 is an elevational view of a leader assembly of the tackle;

FIG. 3 is a plan view of a fishhook leader connector on an enlarged scale, and

FIG. 4 is a longitudinal vertical sectional view of the connector, an associated sinker leader being shown in full lines in a normal position and in broken lines in a passing position.

In the drawing, the numeral 10 designates generally fishing tackle arranged in accordance with the invention. The tackle is here shown to be of the casting type adapted for fishing in a river 11 flowing over a bed 12, although the tackle may also be used for trolling.

The tackle comprises a leader assembly including a sinker leader 13 and a detachably connected fishhook leader 14. The sinker leader is formed of suitable material such as nylon or stranded stainless steel cable, the latter being either plastic-coated or bare. The leader is here shown to have looped upper and lower end portions 15 and 16 secured by pressed metal sleeves 17. A snaphook 18 is secured to the looped lower end portion of the leader and is detachably secured to an eyed upright swivel rod 19 of a conventional sinker 20 adapted to descend to the river bed. The looped upper end portion of the leader is secured to a swivel 21 to which a fishing line 22 is tied or otherwise secured. If desired, the line may be provided with a swivel-type snaphook, not shown, to facilitate attachment and detachment of the sinker leader. The line is wound on a reel 23 of a casting rod 24 having the usual line guides 25.

Rigidly secured to the sinker leader 13 are a series of longitudinally spaced shoulder-forming beads or protuberances 26, and a lowermost bead or protuberance 26', these beads being formed of plastic or metal. By way of example, the beads may be spaced 2 to 3 inches apart along the sinker leader, and the leader may be about 15 to 18 inches long. The beads are preferably of generally spherical or spheroidal shape.

The fishhook leader 14 is formed of suitable material, such as nylon, and is tied or otherwise attached at one end to a fishhook 27 adapted to be baited. The other end of the fishhook leader is tied or otherwise attached to a swivel 28 with a snaphook 29, and the snaphook is attached to a connector or coupler 30 here shown in the form of a flat oval plate of plastic material or sheet metal, the connector plate extending in a plane transverse to the sinker leader. The connector plate is adapted to be shifted along the leader to adjust the fishing depth or level of the fishhook above the river bed. The connector plate has a small transverse bore 31 near its wide end to which the fishhook leader snaphook 29 is attached, and a small transverse bore 32 near the narrow end adapted to receive the sinker leader, these two bores being disposed on the major axis of the connector plate. The bore 32 forms the outer closed end of a slot 33 extending along the major axis of the plate, and the other end of the slot communicates with a larger circular clearance opening 34 disposed at the major axis and near the center of the plate, thus forming a keyhole-shaped aperture. The clearance opening 34 is slightly larger in diameter than the shoulder-forming beads 26 on the sinker leader so as to permit relative passage of these beads through the clearance opening as indicated in broken lines in FIG. 4. The spherical shape of the beads affords a cam action on the edges of the clearance opening facilitating the relative passage of the beads through this opening. The lowermost bead 26' is preferably larger than the clearance opening 34 to form a stop determining the lowermost position of the connector plate 30. The width of the slot 33 is slightly smaller than the diameter of the sinker leader so as to provide a frictional engagement between this leader and the opposite walls of the slot when the leader is shifted between the openings 34 and 32, thus preventing accidental release of the fishhook leader from the small opening 32 when it is disposed in this opening. The connector plate 30 is slightly resilient so as to permit a slight expansion of the slot during the displacement of the leader along the slot. When the sinker leader extends in the small opening or bore 32 of the connector plate, the connector plate may freely swivel on this leader.

In assembling the fishing tackle for use, the connector plate 30 is slipped over the swivel-carrying upper end of the sinker leader 13, and the fishing line 22 is then tied or otherwise secured to the swivel 21. The sinker 20 is then attached to the lower end of the leader by means of the snaphook 18. The fishhook is baited, and the connector 30 is shifted along the sinker leader to a selected position where it is retained by pushing this leader laterally along the connector slot 33 to the small opening 32 at the outer end of the slot, the connector being then confined against accidental reverse displacement along the slot by reason of the small width of the slot 33. In this position, the connector may swivel on the sinker leader. While the connector when thus positioned is capable of a limited displacement along the sinker leader between a pair of adjacent shoulder-forming beads 26 on this leader, the connector will normally rest by gravity on the lower of these two beads.

When the tackle is to be used for fishing in the river 11, the leader assembly is reeled up to the fishing rod 24 and a cast is made into the river. After the cast the sinker 20 bottoms on the river bed 12 and the current carries the fishhook leader 14 downstream from the connected sinker leader, the fishhook being spaced above the river bed a suitable distance determined by the elevational adjustment of the connector 30 along the beaded sinker leader. This connector adjustment can easily and quickly be changed to suit fishing conditions, it being only necessary for the fisherman, after the leader assembly is reeled in, to release the sinker leader from the connector opening in bore 32 by pushing it along the slot 33 to the large clearance opening 34 in the connector, whereupon the connector is shifted along the sinker leader and over one or more of the beads, as indicated by broken lines in FIG. 4, to a new location where this leader is again pushed laterally along the slot 33 to the small leader-receiving opening 32. This manipulation can readily be effected by the sense of feel, even in the dark, and there is no danger of losing the connector plate and the attached fishhook leader.

The fishing tackle may also be used for trolling in a lake or river, in which event the sinker descends to a desired position above the water bed, and the fishhook leader assumes a trailing position at an adjusted distance above the water bed. In this case the sinker preferably remains above the water bed to avoid being entangled in weeds. However, if the water bed is clear and relatively smooth the sinker may be dragged along the water bed.

After fishing, the leader assembly can easily and quickly be dismantled. The sinker 20 is detached from its leader 13, and the fishhook leader 14 is detached from the connector 30. The sinker and the fishhook leader may then be stored in a tackle box. The sinker leader, however, preferably remains attached to the fishing line 22 and is reeled in to the fishing rod tip, the reel being then locked in position. The snaphook 18 on the free end of the sinker leader can be temporarily attached to one of the line guides 25 of the fishing rod, as indicated by broken lines in FIG. 1. The connector 30 remains on the sinker leader so as to avoid loss of the connector.

We claim:

1. In fishing tackle, a sinker leader adapted for attachment to a fishing line and having longitudinally spaced shoulder-forming enlargements thereon, and a fishhook leader connector plate having a keyhole-shaped aperture therein with a clearance hole portion larger than said enlargements and adapted to pass said sinker leader enlargements and a slot portion of lesser width than said enlargements and with a closed outer end, said slot portion being adapted to admit said sinker leader to the closed end thereof, whereby to retain said fishhook leader connector at selected positions along said sinker leader.

2. In fishing tackle, a sinker leader adapted for attachment to a fishing line and having longitudinally spaced shoulder-forming enlargements thereon, and a fishhook leader connector plate having a keyhole-shaped aperture therein with a clearance hole portion larger than said enlargements and adapted to pass said sinker leader enlargements and a slot portion of lesser width than said enlargements and with a closed outer end, said slot portion being adapted to admit said sinker leader to the closed end thereof, whereby to retain said fishhook leader connector at selected positions along said sinker leader, said sinker leader having a frictional sliding fit in said slot portion to yieldably resist displacement of said leader from the outer end of said slot portion.

3. In fishing tackle, a sinker leader adapted for attachment to a fishing line and having longitudinally spaced shoulder-forming enlargements thereon, and a fishhook leader connector plate having a keyhole-shaped aperture therein with a clearance hole portion larger than said enlargements and adapted to pass said sinker leader enlargements and a slot portion of lesser width than said enlargements and with a closed outer end, said slot portion being adapted to admit said sinker leader to the closed end thereof, whereby to retain said fishhook leader connector at selected positions along said sinker leader, and stop means near the lower end of the sinker leader to prevent loss of the connector plate.

4. In fishing tackle, a sinker leader adapted for attachment to a fishing line and having thereon longitudinally spaced shoulder-forming beads of rounded shape, and a fishhook leader connector shiftable along said sinker leader to selected positions, said connector having a clearance opening slightly larger than said beads and adapted to pass said beads and a slot extending from said opening and having a closed end, the width of said slot being smaller than the breath of said beads, whereby to support said connector on a selected subjacent bead, said rounded beads when in approximate alignment with said clearance opening having a cam action on the edge of said opening to facilitate relative passage of said beads through said opening.

5. In fishing tackle, a sinker leader adapted for attachment to a fishing line and having thereon longitudinally spaced shoulder-forming beads of rounded shape, a fishhook leader connector shiftable along said sinker leader to selected positions, said connector having a clearance opening slightly larger than said beads and adapted to pass said beads and a slot extending from said opening and having a closed end, the width of said slot being smaller than the breath of said beads, whereby to support said connector on a selected subjacent bead, and a fishhook leader detachably secured to said connector, said rounded beads when in approximate alignment with said clearance opening having a cam action on the edge of said opening to facilitate relative passage of said beads through said opening.

6. In fishing tackle, a sinker leader adapted for attachment to a fishing line and having shoulder-forming enlargements spaced longitudinally of said leader, and a fishhook leader connector shiftable along said sinker leader to selected positions, said connector having a clearance opening slightly larger than said enlargements and adapted to pass said enlargements therethrough and a closed-end slot extending from said opening and adapted to admit said sinker leader, the width of said slot being smaller than the breadth of said enlargements, whereby to support said connector on a selected subjacent enlargement when said sinker leader is disposed in said slot.

References Cited by the Examiner

UNITED STATES PATENTS

| 86,154 | 1/69 | Hiltz | 43—44.83 |
| 1,471,959 | 10/23 | Halferty | 43—44.83 |
| 2,033,701 | 3/36 | Gibbs | 43—44.84 |
| 2,482,901 | 9/49 | Cianfrone | 43—44.85 |
| 2,592,438 | 4/52 | Lawrenz | 43—44.85 |
| 2,848,835 | 8/58 | Witt | 43—42.74 |
| 2,908,989 | 10/59 | Povinelli et al. | 43—42.74 |

FOREIGN PATENTS

| 18,962 | 1892 | Great Britain. |
| 6,498 | 8/98 | Norway. |

SAMUEL KOREN, *Primary Examiner.*